(12) United States Patent (10) Patent No.: US 7,979,658 B2
Obereiner et al. (45) Date of Patent: Jul. 12, 2011

(54) SECURE MANAGEMENT OF MEMORY REGIONS IN A MEMORY

(75) Inventors: Willy Obereiner, San Jose, CA (US); Hendrik Graulus, Los Gatos, CA (US)

(73) Assignee: Spansion LLC, Sunnyvale, CA (US)

( * ) Notice: Subject to any disclaimer, the term of this patent is extended or adjusted under 35 U.S.C. 154(b) by 585 days.

(21) Appl. No.: 12/054,740

(22) Filed: Mar. 25, 2008

(65) Prior Publication Data

US 2009/0249014 A1 Oct. 1, 2009

(51) Int. Cl.
*G06F 12/14* (2006.01)
(52) U.S. Cl. ............ 711/164; 711/163; 715/741; 726/2; 726/19; 713/189; 713/193
(58) Field of Classification Search .......... 711/163–164; 713/189, 193; 715/741; 726/2, 4, 5, 17–19, 726/21
See application file for complete search history.

(56) References Cited

U.S. PATENT DOCUMENTS

2007/0011419 A1* 1/2007 Conti ............................ 711/163

FOREIGN PATENT DOCUMENTS

WO 2008/003081 1/2008

* cited by examiner

*Primary Examiner* — Jasmine Song
(74) *Attorney, Agent, or Firm* — Turocy & Watson, LLP

(57) ABSTRACT

Systems and/or methods that facilitate controlling access to memory regions in a memory component(s) are presented. A memory component can comprise an access management component that can facilitate controlling access to memory regions that can be respectively associated with authentication credentials. The access control component can facilitate access of a memory region when received authentication information matches authentication information contained in a security record associated with the memory region. The access management component can facilitate a wipe erase of a memory region(s) to facilitate secure removal of information from the memory region when predetermined criteria is satisfied. The access management component can facilitate locking a memory region when a maximum number of attempts to access a memory region are unsuccessful to facilitate security of the memory regions and/or data associated therewith, where a locked memory region remains locked until a reset is performed.

20 Claims, 10 Drawing Sheets

SECURE MANAGEMENT OF MEMORY REGIONS IN A MEMORY

TECHNICAL FIELD

The subject innovation relates generally to memory systems and in particular to systems and methods for securing information associated with memory devices.

BACKGROUND

A wide variety of memory devices can be used to maintain and store data and instructions for various computers and similar systems. In particular, flash memory is a type of electronic memory media that can be rewritten and that can retain content without consumption of power. Flash memory has become popular, at least in part, because it combines the advantages of the high density and low cost of EPROM with the electrical erasability of EEPROM. Flash memory is nonvolatile; it can be rewritten and can hold its content without power. Flash memory can be used in many portable electronic products, such as cellular phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make flash memory devices useful and popular means for transporting and maintaining data.

Conventionally, data stored in a memory in an electronic device, such as a cellular phone, can be deleted. However, even though the data is deleted and even though a user may believe that the data is erased from the memory, the data can still reside in the memory, but the access information (e.g., pointer) that was associated with the data and utilized to access the data can be removed, so that the user does not perceive that the data is still stored in the memory. A user can have sensitive personal information stored on the electronic device, and the user can desire to maintain the privacy of such information. If a user decides to sell or otherwise dispose of his electronic device, the user can delete the data (e.g., sensitive information) and may not realize that the data is still stored in the memory.

It is desirable to manage information associated with a memory device, so that information, such as sensitive information of a user, can be secured in the memory device, and securely and completely removed from the memory device, as desired by an authorized user. It is also desirable to manage access to a memory device to facilitate data security in the memory device.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that facilitate securing data associated with a memory device. In accordance with one aspect of the disclosed subject matter, a memory component can comprise a memory array(s) (e.g., nonvolatile memory array) that can contain a plurality of memory cells wherein each memory cell can stored one or more bits of data. In one aspect, the memory array(s) can comprise one or more memory regions that can respectively contain and/or be associated with a subset of the memory cells. For example, the memory component can be employed in an electronic device, such as a cellular phone, and different users of the cellular phone can have access to different memory regions in the memory component, where one or more memory regions can be protected, as access to one or more memory regions can be controlled (e.g., restricted) based in part on respective authentication information (e.g., authentication credentials).

In accordance with one aspect, the memory component can comprise an access management component that can be employed to facilitate controlling access to one or more memory regions. In accordance with certain aspects of the disclosed subject matter, the access control component can facilitate controlling the setting of an authentication credential (e.g., password, pass phrase, personal identification number (PIN), biometric information associated with a user, etc.) of a respective user; enabling read, write, erase, and/or wipe erase functions based in part on received authentication information as compared to stored authentication information contained in a security record(s) associated with the memory region(s); performing a wipe erase of a memory region(s) to permanently erase data from the memory region; resetting an authentication credential to a default authentication credential after a wipe erase is performed; locking a memory region(s) and/or the memory component if improper authentication information is received a specified number of times based in part on a predetermined maximum number of attempts to present authentication information by a user.

For example, if a wipe erase of a memory region is initiated, a user can be requested to input an authentication credential a predetermined number of times, and the access management component can receive such authentication information. The access management component can compare the received authentication information and can compare each authentication credential presented with authentication information associated with the memory region that can be stored in a security record in a highly secure area of the memory array. If each piece of received authentication information respectively matches the stored authentication information, the access management component can determine that access to the memory region in order to perform a wipe erase can be enabled, and the access management component can facilitate performing a wipe erase of the memory region, can facilitate resetting the authentication credential (e.g., authentication value) associated with that memory region to a default authentication value or can enable such memory region to be unrestricted, as desired, can facilitate generating a new security record that can be associated with the memory region, and/or can facilitate permanently erasing the old security record associated with the memory region.

In accordance with another aspect, the access management component can reside within the memory component to facilitate improved security of data and/or the memory component. Conventionally, a host processor and/or software associated with the host processor manage access to memory locations in the memory device, such as memory locations that are password protected. The subject innovation by employing an access management component that can facilitate controlling access to the memory regions in the memory array while residing within the memory component can facilitate improved security of the data and the memory component, as compared to conventional memory systems/devices, which can be corrupted by malicious software, for example.

In accordance with still another aspect, methods that can facilitate managing access to memory regions in a memory component are presented. In another aspect, electronic devices that can comprise a memory component that can contain an access management component to facilitate securing the memory component and/or data associated therewith, in accordance with the disclosed subject matter, and/or can comprise systems that can facilitate securing data associated with a memory component are presented.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
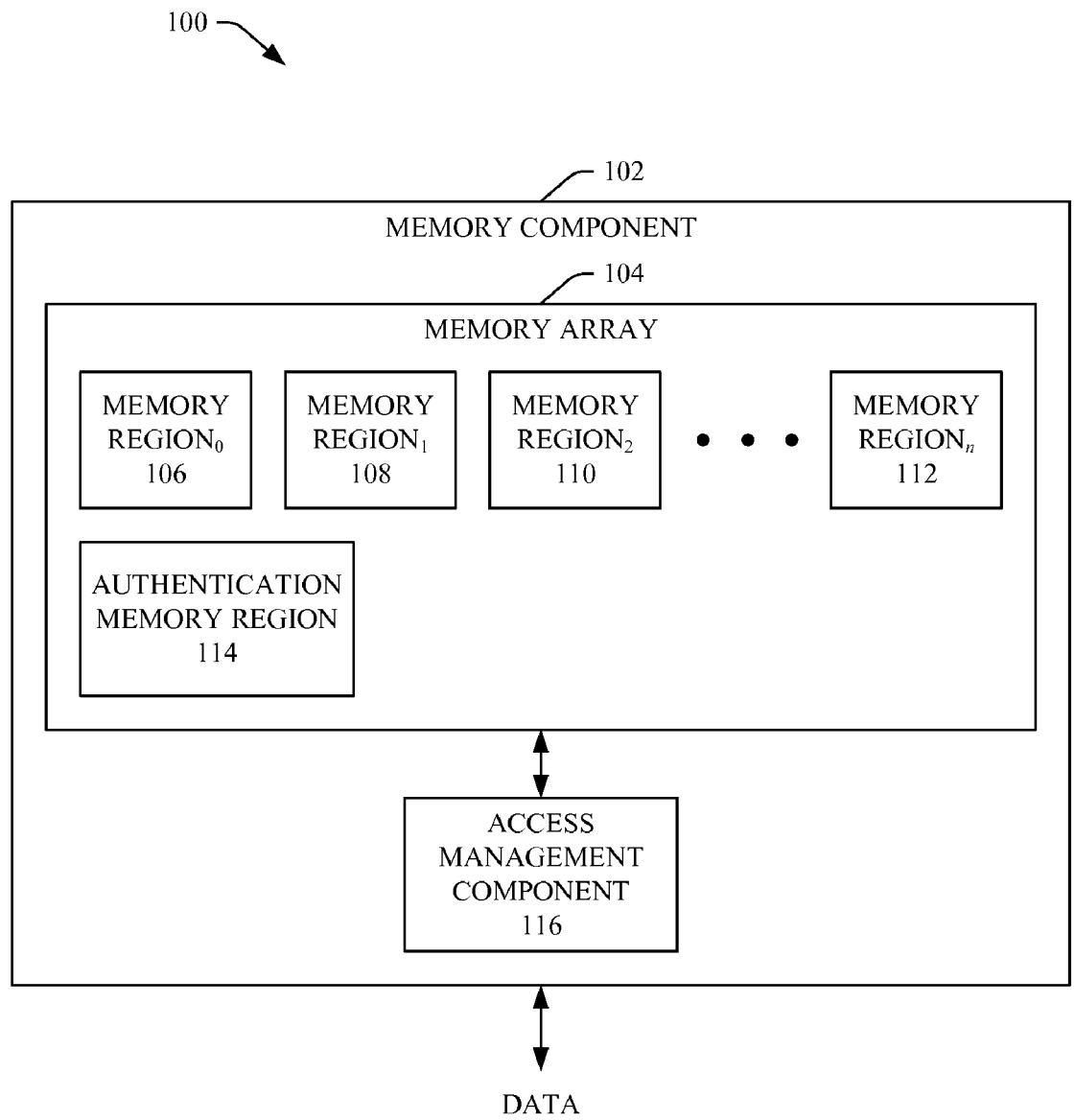
FIG. 1 illustrates a block diagram of a system that can facilitate control of access to memory regions associated with a memory component in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Conventionally, a host processor and/or software associated with the host processor can control access to a memory, or a portion thereof. However, a host processor and/or software can be hacked or corrupted, for example, by malicious software, which can be utilized to gain unauthorized access to the memory. Further, any protections offered by the host processor and/or associated software can be bypassed by disconnecting the memory from the host processor, where a hacker potentially can connect another processor to the memory in order to gain unauthorized access to the memory.

Systems and/or methods are presented that can facilitate securing respective regions of a memory device to facilitate securing such memory regions from unauthorized access, and can facilitate performing a wipe erase to completely erase data in a memory region(s) to facilitate the efficient and secure removal of data (e.g., personal information). The subject innovation can employ an access management component that can be contained within a memory component (e.g., flash memory) to facilitate controlling access to memory regions in the memory component. As a result, the risk of unauthorized access of the memory regions through the use of malicious software can be significantly reduced and/or eliminated. With the access management component being contained within the memory component, the risk of bypassing the security measures associated with the memory component in order to gain unauthorized access can be reduced and/or eliminated, as compared to conventional security measures.

Turning to the figures, FIG. 1 illustrates a system 100 that can facilitate access of a memory region(s) in a memory in accordance with an aspect of the disclosed subject matter. System 100 can include a memory component 102 that can be comprised of a non-volatile memory (e.g., flash memory) and/or volatile memory (e.g., random access memory (RAM)). The memory component 102 can receive information, including data, commands, and/or other information, which the memory component 102 can process (e.g., store data, execute commands, etc.). The memory component 102 can include a memory array 104 that can receive and store data. The memory array 104 can include a plurality of memory cells (not shown) wherein each memory cell can store one or more bits of data. Data stored in a memory cell(s) in the memory array 104 can be read and such data can be provided as an output, or can be erased from the memory cell(s).

Figure 3:
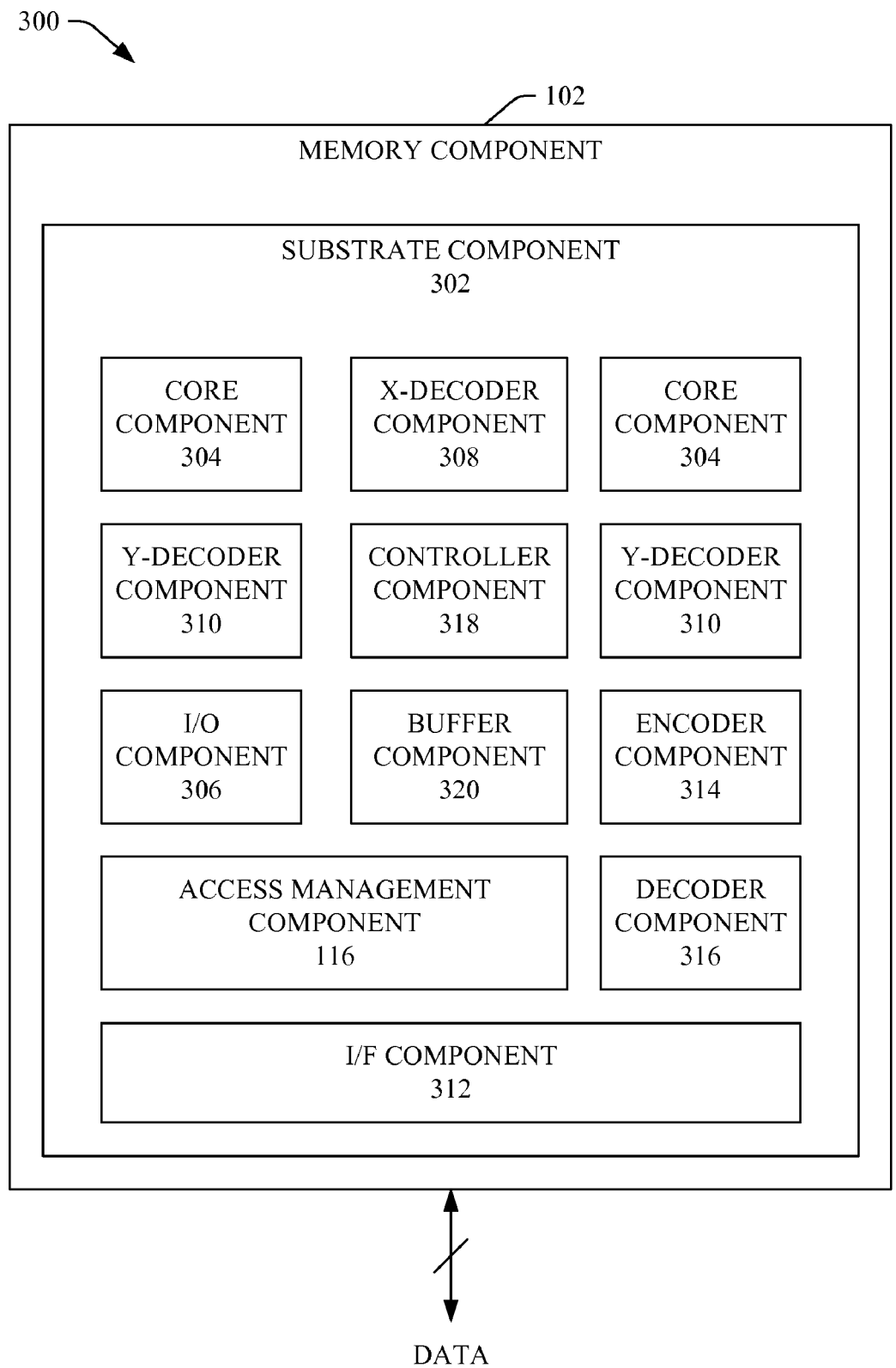
FIG. 3 is a block diagram depicting a memory device that can facilitate data storage in accordance with an embodiment of the subject matter disclosed herein.

In accordance with an aspect of the disclosed subject matter, the memory array 104 can comprise a plurality of memory regions, such as memory region$_0$ 106, memory region$_1$ 108, memory region$_2$ 110, and up to memory region$_n$ 112, where n can be virtually any integer number. Each memory region 106, 108, 110, 112 can be comprised of a subset of memory cells, wherein data can be stored. One or more of the memory regions 106, 108, 110, 112 can have authentication data (e.g., authentication credential) respectively associated therewith, where the authentication data can comprise, for example, a password, pass phrase, personal identification number (PIN), biometric identification information (e.g., fingerprint, face, eye, etc.), and/or other authentication data, and the authentication data can be stored in a password memory region 114, which can be a highly secure region in the memory array 104 that is accessible only by authorized components, such as an access management component 116 and/or controller component (e.g., controller component 318, as illustrated in FIG. 3 and described herein), and/or authorized entities (e.g., manufacturer).

In accordance with another aspect, the memory component 102 can contain an access management component 116 that can facilitate controlling access to one or more of the memory regions 106, 108, 110, 112 in the memory array 104 as well as controlling the performance of wipe erases of one or more of the memory regions 106, 108, 110, 112 in order to facilitate securing the data while it resides in the memory component 102 and/or the secure and permanent removal of data (e.g., via wipe erase), such as when a user associated with a memory region(s) (e.g., 106) desires to securely and permanently remove information (e.g., sensitive information) contained in the memory region(s) associated with the user.

Conventionally, a host processor and/or software associated with the host processor controls access to a memory, or a portion thereof, and also controls wipe erases of the memory, or a portion thereof. However, a host processor and/or software can be corrupted, for example, by malicious software, which can be utilized to gain unauthorized access to the memory. Further, any protections offered by the host processor and/or associated software can be bypassed by disconnecting and/or removing the memory, so that the memory is no longer connected to the host processor, where a hacker can connect another processor to the memory in order to gain access to the memory.

The subject innovation can provide improved security of data associated with the memory component 102 by employing the access management component 116, which can be contained within the memory component 102, to facilitate controlling access to one or more of the memory regions 106, 108, 110, 112 in the memory component 102. As a result, the risk of unauthorized access of the memory array 104 through the use of malicious software can be significantly reduced and/or eliminated. Further the subject innovation can reduce and/or eliminate the risk of bypassing the security measures associated with the memory component 102 in order to gain unauthorized access, as the access management component 116 is contained within the memory component 102 and can facilitate making decisions and controlling the access to one or more of the memory regions 106, 108, 110, 112.

Figure 5:
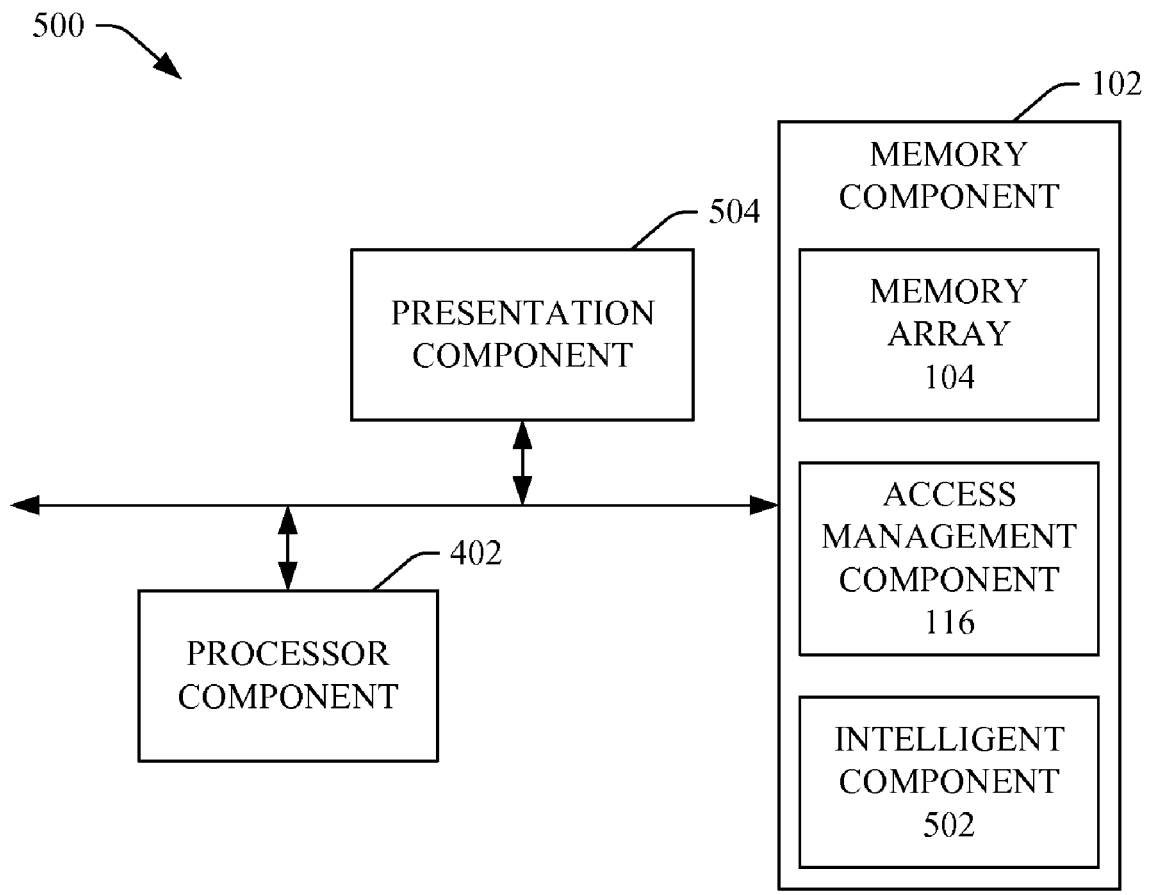
FIG. 5 depicts a block diagram of a system that can employ intelligence to facilitate control of access to a memory component in accordance with an aspect of the disclosed subject matter.

In accordance with an aspect of the disclosed subject matter, the access management component 116 can facilitate setting authentication data (e.g., authentication credentials, such as a password, PIN, biometric identification information, etc.) of a user (e.g., person, entity, application, etc.) with regard to a memory region(s) (e.g., 106) in the memory component 102. Initially, one or more of the memory regions 106, 108, 110, 112 can have a default authentication value respectively associated therewith or can be unrestricted with no authentication credential set, where the authentication credential (e.g., authentication value) can be a series of predetermined alphanumeric characters and/or biometric information, and where the default authentication credential can be as desired (e.g., by a manufacturer). In one aspect, an authentication set command can be generated to initiate setting of the authentication credential. The access management component 116 can receive authentication credential from the user via a user interface (e.g., presentation component 504, as depicted in FIG. 5 and described herein), and can receive an authentication credential one or more additional times from the user, where the user can be requested to input the desired authentication credential an additional time(s) to facilitate ensuring the authentication credential is as desired by the user. The access management component 116 can compare each received authentication credential to determine whether they match each other. If the respective authentication credentials match each other, the access management component 116 can set the authentication credential for the memory region(s) (e.g., 106) as the authentication credential provided by the user. The authentication credential and other authentication information and/or associated memory region information, such as the memory start address, memory end address, and/or memory region size, can be stored as a security record in a authentication memory location in the authentication memory region 114 in a highly secure area of the memory array 104.

In accordance with an aspect, the authentication memory location of an authentication memory region 114 can be a predetermined size (e.g., 128 bits, 1028 bytes, or more) and the portion (e.g., 16, 32, 64 bits, or more) of the authentication memory location for storage of the authentication credential can be as desired. Other portions of the authentication memory location can be utilized to store information regarding the associated memory region, such as the start memory address for such memory region (e.g., 106), the end memory address for such memory region, the size of such memory region, and/or other information. In accordance with one embodiment, the authentication information can include a password hint that can be provided to a user to assist the user in remembering an authentication credential, where the authentication credential hint can be provided to the access management component 116 by the user, and can be stored with the other authentication information in the security record in the authentication memory location.

In still another aspect, there can be n+m security records (e.g., storing authentication credentials, memory region information, other information), where there can be n security records, one for each memory region 106, 108, 110, 112, and m extra security record(s) that can be utilized to facilitate changes or updates to the security record(s) associated with the memory regions 106, 108, 110, 112, wherein n and m can be respective integer numbers, as desired. There can also be n+m authentication memory locations, each of which can contain a security record. Each of the security records can be individually written, read, and/or erased. In one aspect, when there is a change or update to a security record, such as a setting of an authentication credential for a memory region (e.g., 106), or a wipe erase of a memory region which can result in the authentication credential being set to a default authentication credential or making the memory region an unrestricted memory region, as desired, the access management component 116 can facilitate generating a new security record for such memory region. After the new security record is generated and stored in a free authentication memory location, the old security record for such memory region can be erased. This can facilitate ensuring that the previous security record can be available, for example, in case there is a power disruption during generation of the new security record and/or during a wipe erase. In such case, the wipe erase can be performed again using the previous security record.

In still another aspect, the access management component 116 can facilitate incrementing a security record count associated with the security records, so that the security record count can correspond with the most recently generated security record. The access management component 116 can analyze or compare the security record count to facilitate requesting and/or accessing the security records based in part on the security record count, for example, during power up of the memory component 102, so that the access management component 116 can have and utilize the current security records that can identify the current memory region information (e.g., respective authentication credentials, start memory addresses, end memory addresses, and/or memory region sizes, etc.).

In accordance with another aspect, the access management component 116 can facilitate controlling access to the memory regions 106, 108, 110, 112 based in part on an access criteria. The access criteria can include parameters related to the type of access (e.g., read, write, erase, wipe erase) desired, a predetermined number of times a proper authentication credential is to be presented in order to grant access, a predetermined maximum number of attempts (e.g., failed attempts) to present a valid authentication credential, a predetermined number and/or type(s) of disparate authentication credentials to be presented to be granted access to a memory region(s), a type of user (e.g., end user, service provider, manufacturer, super user, administrator, . . . ), etc. It is to be appreciated that the access criteria associated with a memory region 106, 108, 110, 112 can be the same or different, as desired, for the respective types of operations, such as read, write, erase, and/or wipe erase.

A user can desire to perform a read, write, and/or erase associated with a memory region (e.g., 106) associated with the user. In one aspect, the access management component 116 can enable access to the memory region (e.g., 106) if the user presents to the access management component 116 via the user interface a valid password for a predetermined number of times (e.g., 1 time, 2 times, . . . ). The access management component 116 can receive the authentication information and can access the authentication memory location associated with the memory region(s) (e.g., 106) selected by the user. The access management component 116 can compare the received authentication information (e.g., authentication credential(s)) to the authentication credential stored in the associated security record stored in the authentication memory location to determine whether the stored authentication credential matches each received authentication credential(s). If each received authentication credential(s) matches the stored authentication credential, the access management component 116 can determine that access is authorized for the respective operation (e.g., read, write, erase). The access management component 116 can also reset the count (e.g., to 0) with regard to an attempt to gain access to a memory region (e.g., 106).

If the access management component 116 determines that a received authentication credential does not match the stored authentication credential, the access management component 116 can deny access and/or permit the user to attempt to gain access by presenting a valid authentication credential up to a predetermined maximum number of times (e.g., 3 times). The access management component 116 can track and maintain an authentication failure count of the number of failed attempts (e.g., authentication failures) to gain access to a memory region. If the access management component 116 determines that the predetermined maximum number of authentication failures is reached, the access management component 116 can facilitate locking the memory region(s) (e.g., 106), so that the memory region(s) (e.g., 106) or memory component 102 cannot be accessed until a reset is performed, or the memory region(s) (e.g., 106) or memory component 102 is otherwise unlocked, such as by a super user or administrator, as desired. In one aspect, the reset can be performed by a power cycling of the memory component 102, where the memory component 102 can be powered down and then powered up. In another aspect, the memory component 102 can be reset by a hardware reset or software reset of the memory component 102.

For example, a memory region (e.g., 106) can have a security record associated therewith. The security record can provide that a particular authentication credential be provided in order to access the memory region. To facilitate securing the memory region, the access management component 116 can control access to the memory region by only granting access rights to the memory region if the particular access credential is presented a specified number of times (e.g., 1 time, 2 times, 3 times, . . . ) to the access control component 116. As another example, the memory region can have an associated security record, where the security record can provide that a predefined number (e.g., 2) of disparate authentication credentials be provided in order to access the memory region (e.g., an associate employee provides a first authentication credential and the employee's supervisor provides a second authentication credential to access a memory region). To facilitate securing the memory region, the access management component 116 can control access to the memory region by only granting access rights to the memory region if each of disparate authentication credentials access credential is presented to the access control component 116, wherein the number of times each disparate authentication credential is presented can be predefined, as desired (e.g., 1 time, 2 times, . . . ).

In accordance with an aspect of the disclosed subject matter, the access management component 116 can facilitate controlling and/or performing a wipe erase of a memory region (e.g., 106) based in part on the access criteria. In one aspect, the wipe erase can be a permanent erase of a memory region(s) (e.g., 106), such that the data can be completely erased from the memory locations, as opposed to the data in the memory locations simply being marked as deleted and/or antiquated, where the data can still reside in the memory locations, but pointers or other information that are utilized to access such data are removed.

For example, the memory component 102 can be in a cellular phone, and a user can have personal information stored in a memory region (e.g., 106) in a memory component 102. The user desires to sell the cellular phone to buy a new phone. Conventionally, when the user deletes the personal information stored in the memory of the cellular phone, the data can still reside in the memory, even though the data may be marked and understood by the memory and other components (e.g., host processor) as deleted. Another entity can obtain the cellular phone and can potentially access the data, such as the personal information, that still resides in the memory region (e.g., 106), even if deleted.

The subject innovation can employ the access management component 116 to facilitate performing a wipe erase in a secure manner to completely and permanently erase the data stored in the memory region(s) (e.g., 106), as desired by an authorized user. As a result, a subsequent user or other entity that gains possession of the cellular phone, as in the above example, is not able to discover the personal information of the previous user.

In accordance with an aspect, the access management component 116 can employ access criteria associated with a wipe erase, where a valid authentication credential is to be provided a predetermined number of times (e.g., 3 times) and/or the valid authentication credential is to be presented before a predetermined maximum number of authentication failures (e.g., 3 authentication failures) occurs in order for the wipe erase to be performed. A wipe erase command can be generated, and can be received by the access management component 116. The access management component 116 can receive an authentication credential from a user via a user interface (e.g., presentation component 504, as depicted in FIG. 5 and described herein), where the authentication credential can be presented and received a predetermined number of times. The access management component 116 can retrieve authentication information and/or other information (e.g., authentication credential, memory region start address, memory region size, etc.) associated with the memory region (s) (e.g., 106) from the associated security record stored in the authentication memory location in the authentication memory region 114. The access management component 116 can compare each of the received authentication credentials with the stored authentication credential associated with the memory region(s) (e.g., 106). If each of the received authentication credentials match the stored authentication credential, the access management component 116 can determine that access can be enabled to perform the wipe erase, and the access management component 116 can facilitate enabling access to the memory region(s) and the wipe erase can be performed to erase (e.g., permanently erase) the data from the memory region(s) (e.g., 106).

If, however, the access management component 116 compares respective authentication credentials and determines that one or more of the received authentication credentials do not match the stored authentication credential, the access management component 116 can deny access and/or permit the user to attempt to gain access by presenting a valid authentication credential up to a predetermined maximum number of times (e.g., 3 times). The access management component 116 can track and maintain an authentication failure count of the number of failed attempts to gain access to a memory region (e.g., 106). If the access management component 116 determines that the predetermined maximum number of authentication failures reached in an attempt to gain access and perform a wipe erase, the access management component 116 can facilitate locking the memory region(s) (e.g., 106) and/or the memory component 102, so that the memory region(s) (e.g., 106) and/or memory component 102 cannot be accessed and/or the memory region(s) (e.g., 106) cannot be wipe erased until a reset is performed and/or the memory region(s) (e.g., 106) and/or memory component 102 are otherwise unlocked (e.g., by an administrator or super user). In one aspect, the reset can be performed by a power cycling of the memory component 102, where the memory component 102 can be powered down and then powered up. In another aspect, the memory component 102 can be reset by a hardware reset or software reset of the memory component 102. As a result, the memory regions 106, 108, 110, 112 and data associated therewith can be secure from attempts to hack into the memory regions 106, 108, 110, 112.

It is to be appreciated and understood that in accordance with the disclosed subject matter, as desired, access to a memory region (e.g., 106) can be restricted such that more than one authentication credential has to be presented to the access management component 116 in order to perform a wipe erase. For example, a company can store sensitive data in a memory region, and to facilitate securing data in the memory region, the access to the memory region can be restricted such that an associate employee has a first authentication credential and a supervisor has a second authentication credential, and both the first and second authentication credentials have to be presented to the access management component 116 a predetermined number of times (e.g., 1 time, 2 times, 3 times, . . . ) in order to access and perform a wipe erase of that memory region.

Referring back to the memory component 102, the non-volatile memory can include, but is not limited to, read-only memory (ROM), flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (FeRAM)). A flash memory can be comprised of NAND memory and/or NOR memory, for example. Volatile memory can include, but is not limited to, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

It is to be appreciated that, while only one memory component 102 is illustrated, the subject innovation is not so limited, and the subject innovation can comprise one or more memory components (e.g., 102) that can each contain respective memory regions (e.g., 106, 108, 110, 112) and/or respective access management components 116.

Referring back to the memory regions 106, 108, 110, 112, the memory regions 106, 108, 110, 112 can be allocated, as desired. In one aspect, each memory region 106, 108, 110, 112 can be the same size or they can be different sizes. In another aspect, each memory region 106, 108, 110, 112 can be associated with a different authentication credential, or there can be more than one memory region that can be associated with the same authentication credential, such as when a user is authorized to access more than one memory region. In accordance with another aspect, a disparate authentication credential or the same authentication credential, as desired, can be utilized with respect to each type of command (e.g., read, write, erase, wipe erase).

In accordance with one embodiment, there can be one or more dedicated memory regions (e.g., 106) that can be dedicated to respective users, where each memory region(s) can be associated with a respective authentication credential(s), and there can be one or more other memory regions that can be common memory regions that can be accessed with an authentication credential associated with one or more of the dedicated memory regions. For example, a first user can have a dedicated memory region and an authentication credential associated therewith; a second user can have a another dedicated memory region and another authentication credential associated therewith; and a third user can have still another dedicated memory region and another authentication credential associated therewith. In addition to using their respective authentication credentials to access their respective memory regions, there can be a common memory region that can be accessed by two or more of the users using their respective authentication credentials (or there can be a common authentication credential(s) for a particular memory region(s) that provides shared access), where the access management component 116 can control the access to the respective memory regions, and the authentication memory location in the authentication memory region 114 can store all authentication credentials for which access is authorized with regard to the common memory region.

In one aspect, the memory component 102 also can be open for limited access (and/or functionality) without authentication being required. For example, a portion(s) of the memory array 104 and/or other areas in the memory component 102 can be open for limited access without authentication being required. After a successful authentication, the memory region(s) being accessed can be accessible for additional functions, such as read, write, erase, and/or wipe erase based in part on the access rights granted.

Figure 2:
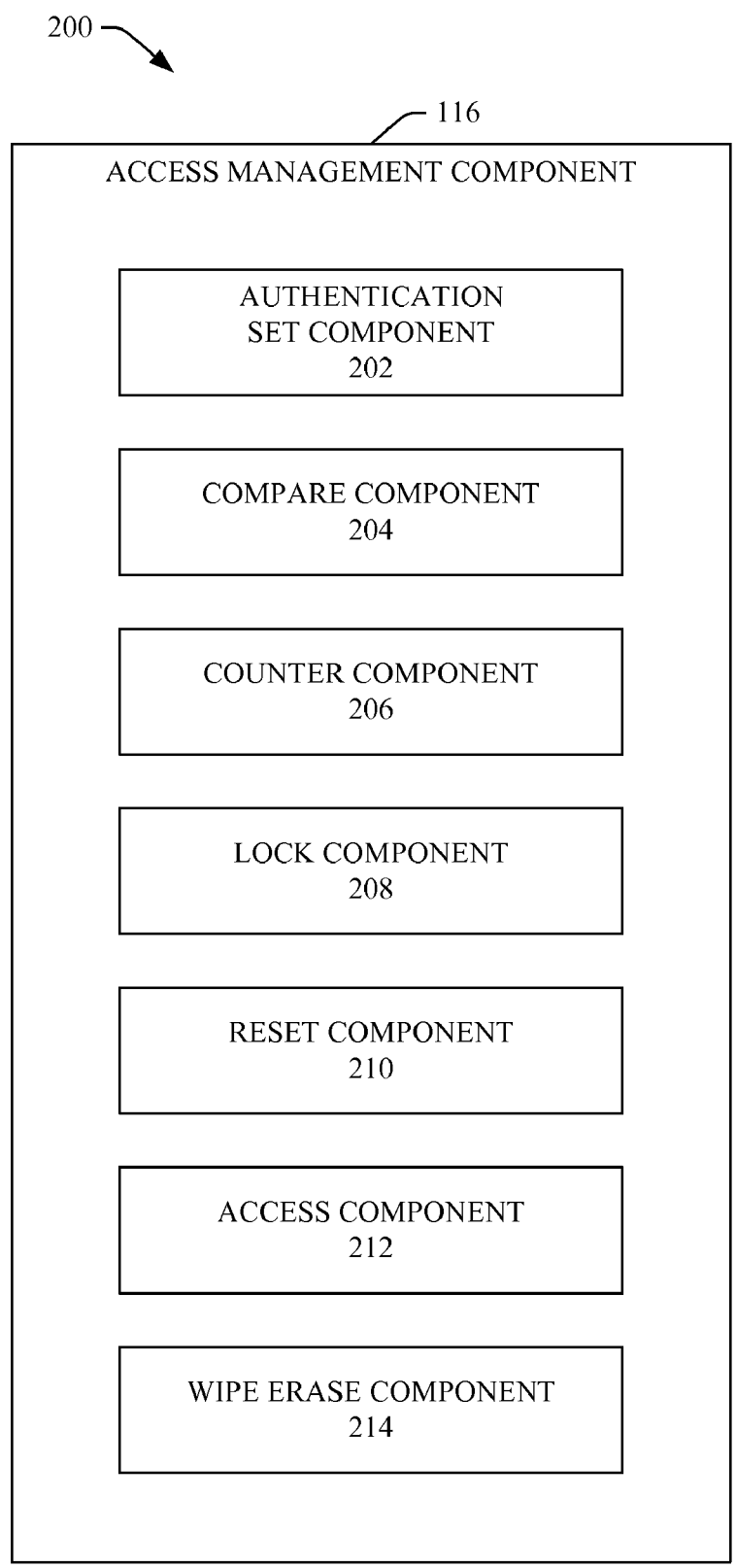
FIG. 2 depicts an example of a block diagram of a system that can facilitate control of access to memory regions associated with a memory component in accordance with an aspect of the disclosed subject matter.

Turning to FIG. 2, depicted is a block diagram of a system 200 that can facilitate access of a memory region(s) in a memory in accordance with an aspect of the disclosed subject matter. System 200 can comprise an access management component 116 that can facilitate controlling access to respective memory regions in a memory array (e.g., memory array 104, as illustrated in FIG. 1 and described herein) in a memory component 102 (e.g., memory array 104, as illustrated in FIG. 1 and described herein). The access management component 116 can be the same or similar as, and/or can contain the same or similar functionality as, the access management component 116 as more fully described herein, for example, with regard to system 100.

In one aspect, the access management component 116 can contain an authentication credential set component 202 that can facilitate setting an authentication credential associated with a memory region in the memory array. The authentication credential set component 202 can work in conjunction with a compare component 204 to facilitate setting or changing a new authentication credential for a memory region (e.g., memory region 106, as illustrated in FIG. 1 and described herein) and/or resetting an authentication credential to the default authentication credential or making the associated memory region (e.g., 106) unrestricted, as desired, when a memory region is wipe erased.

In another aspect, the access management component 116 can include the compare component 204 that can compare received authentication information, such as a authentication credential presented by a user, with authentication information associated with a memory region that the user is attempting to access to facilitate determining whether to enable access to the memory region. In still another aspect, the compare component 204 can facilitate setting an authentication credential by comparing received sets of authentication credentials, and comparing them to each other to determine whether the received authentication credentials match to facilitate ensuring accuracy of the desired authentication credential. In yet another aspect, the compare component 204 can facilitate comparing a count, such as a security record count, to facilitate retrieving current security records respectively associated with the memory regions in the memory component 102.

In accordance with an aspect, the access management component 116 can employ a counter component 206 that can manage (e.g., track and/or maintain) security record counts associated with security records, authentication failure counts relating to failed attempts to access a memory region(s) in the memory array, and/or authentication failure counts relating to failed attempts to wipe erase a memory region(s). In yet another aspect, the access management component 116 can contain a lock component 208 that can facilitate locking a memory region(s) in the memory array so that such memory region(s) and/or the memory component 102 cannot be accessed, for example, until a power cycle (e.g., power down and power up) occurs with regard to the memory component 102, a hardware reset or software reset of the memory component is performed, and/or an administrator or a super user unlocks the memory region(s) or memory component 102, as desired. An authentication failure count (e.g., related to access and/or wipe erase) can be reset after a successful authentication. Also, when a memory region(s) has been locked, an authentication failure count can be reset when a power cycle (e.g., power down and power up) occurs with regard to the memory component 102, a hardware reset or software reset of the memory component is performed, and/or an administrator or a super user unlocks the memory region(s) or memory component 102.

In accordance with an aspect, the access management component 116 can comprise a reset component 210 that can facilitate resetting the memory component to facilitate accessing the memory array, or portions thereof (e.g., memory region(s)). For example, if an improper authentication credential is presented a predetermined number of times (e.g., predetermined number of authentication failures occurs), the lock component 208 can facilitate locking the memory region(s) (e.g., 106) that the user was attempting to access and/or the memory component 102. As a result, the memory region can be locked until a reset is performed, or until an administrator or a super user unlocks the memory region(s) and/or memory component 102. The reset component 210 can facilitate resetting the memory component such that the locked memory region(s) can be accessed again (e.g., with a proper authentication credential presented), for instance, when the power cycle of the memory component occurs, such as where the memory component is powered down and powered up again, and/or a hardware reset or software reset of the memory component is performed. In another aspect, the reset component 210 can facilitate enabling an administrator or a super user to unlock the memory region(s) (e.g., 106) and/or memory component 102.

In yet another aspect, the access management component 116 can include an access component 212 that can facilitate enabling access to a memory region (e.g., 106) to perform an operation, such as a read, write, erase, or wipe erase. The access component 212 can receive information from the compare component 204 that can indicate that the predetermined access criteria is satisfied and can enable access for the operation for which the access criteria is satisfied. The access component 212 can facilitate disabling access when the operation is complete and/or when a command is received to disable access.

In accordance with another aspect, the access management component 116 can comprise a wipe erase component 214 that can facilitate a wipe erase of a memory region(s) (e.g., 106) in the memory component 102. If the predetermined access criteria related to a wipe erase is satisfied, the compare component 204 can indicate that such criteria is satisfied to the wipe erase component 214 and/or the access component 212 to facilitate access to the desired memory region(s) and performing a wipe erase of the memory region(s) to completely erase the data stored in the memory region(s).

Turning to FIG. 3, depicted is a diagram of a memory device 300 that can facilitate storage of data in accordance with an embodiment of the disclosed subject matter. Memory device 300 can include a memory component 102 that can comprise a non-volatile memory (e.g., flash memory) and/or volatile memory (e.g., random access memory (RAM)). The memory component 102 can receive information, including data, commands, and/or other information, which the memory component 102 can process (e.g., store data, execute commands, etc.). The memory component 102 can include an access management component 116 that can facilitate controlling access to memory region(s) (e.g., memory regions 106, 108, 110, 112, as illustrated in FIG. 1 and described herein) in the memory component 102. The memory component 102 and access management component 116 each can be the same or similar as, and/or each can contain the same or similar functionality as, respective components more fully described herein, for example, with regard to system 100 and/or system 200.

In one aspect, the memory component 102, including the access management component 116, and other components described herein, for example, with regard to memory device 300 can be formed and/or contained on a substrate 302 (e.g., semiconductor substrate). In another aspect, one or more core components 304 (e.g., high-density core regions) and one or more lower-density peripheral regions can be formed on the substrate 302. The core component(s) 304 typically can include one or more M by N arrays (e.g., memory array 104) of individually addressable, substantially identical memory cells (not shown), which can be single-bit or multi-bit memory cells. The lower-density peripheral regions can typically include an input/output component 306 (e.g., input/output (I/O) circuitry) and programming circuitry for selectively addressing the individual memory cells. The programming circuitry can be represented in part by and can include one or more x-decoder components 308 and one or more y-decoder components 310 that can cooperate with the I/O component 306 for selectively connecting a source (not shown), gate (not shown), and/or drain (not shown) of selected addressed memory cells to predetermined voltages or impedances to effect designated operations (e.g., writing, reading, verifying, erasing) on the respective memory cells, and deriving necessary voltages to effect such operations. For example, an x-decoder component 308 and a y-decoder component 310 can each receive address bus information, which can be provided as part of a command, and such information can be utilized to facilitate determining the desired memory cell(s) in the memory component 102. In accordance with one embodiment, the memory device 300 can comprise a z-decoder (not shown) that receive address bus information, which can be provided as part of a command, and such information can be utilized to facilitate determining the desired memory cell(s) in the memory component 102. For example, a z-decoder can be employed where memory cells are stacked on top of each other in a multi-die package, and the z-decoder, in conjunction with the x-decoder and y-decoder, can facilitate selection of the desired memory cells in the memory component 102.

Figure 4:
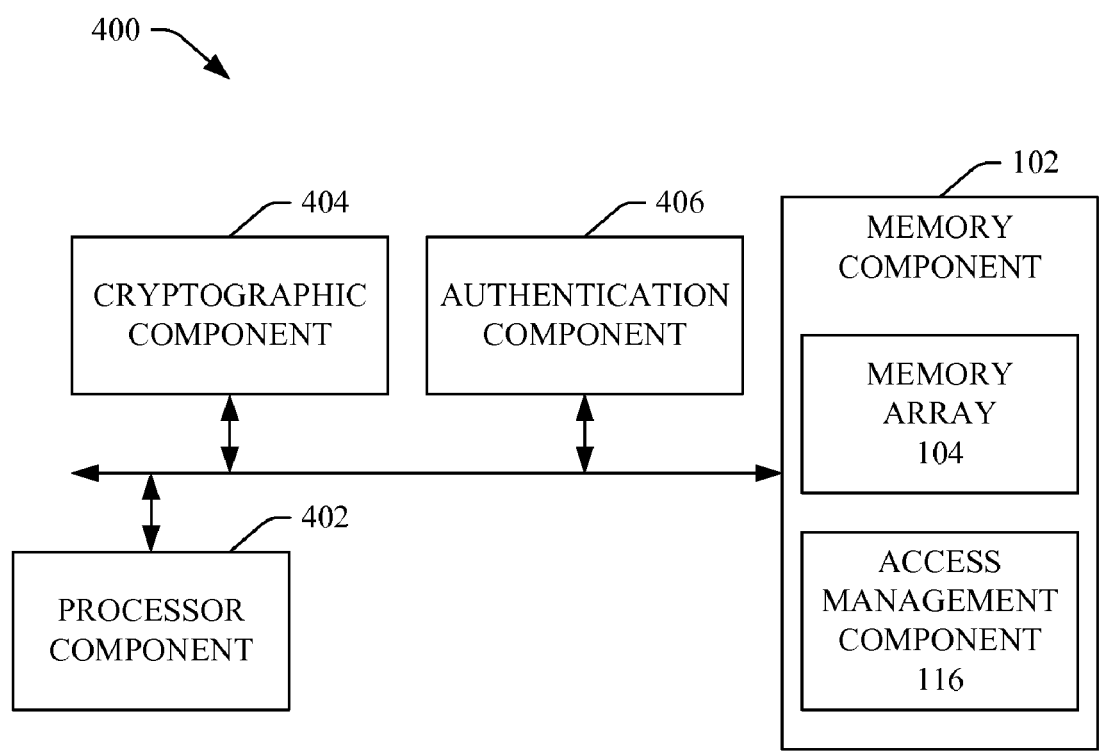
FIG. 4 illustrates a block diagram of a system that can facilitate securing data associated with memory component in accordance with an aspect of the disclosed subject matter.

The memory component 102 can receive information (e.g., data, commands, etc.) via an interface component 312 (also referred to herein as "I/F 312"), which can also be formed on substrate 302. I/F 312 can include and/or provide various adapters, connectors, channels, communication paths, etc. to integrate the memory component 102 into virtually any operating and/or database system(s) and/or with one another system(s). In addition, I/F 312 can provide various adapters, connectors, channels, communication paths, etc., that can provide for interaction and/or communication with a processor component (e.g., as depicted in FIG. 4 and described herein), and/or any other component, data, and the like, associated with the memory device 300.

The memory component 102 can also contain an encoder component 314 that can facilitate encoding data being programmed to the memory component 102, where the encoder component 314 also can be formed on the substrate 302. For example, the encoder component 314 can facilitate converting a digital signal to an analog signal (e.g., current level) to facilitate programming data in the memory locations (e.g., memory cells) in the memory component 102.

The memory component 102 can further include a decoder component 316 that can facilitate decoding data being read from the memory component 102. The decoder component 316 can receive an analog signal associated with data, where the analog signal can be stored in the memory location in the memory array 104, and can facilitate converting the analog signal to a digital signal, so that such digital signal representing the read data can be provided to another component (e.g., processor component) for further processing.

In one aspect, the memory component 102 can also include a controller component 318 that can facilitate control of the flow of data to and from the memory component 102. In an aspect, the controller component 318, by itself or in conjunction with the processor component, can facilitate execution of operations (e.g., read, write, verify, erase) associated with memory locations in the memory array 104. In another aspect, the controller component 318 can facilitate verifying and/or maintaining the desired charge level(s) associated with data stored in the memory locations in the memory array 104. In still another aspect, a buffer component 320 can be formed on the substrate 302. The buffer component 320 can facilitate storage of data, for example, to temporarily store data, being written to and/or read from the memory array 104.

It is to be appreciated that the memory device 300 refers to one embodiment of a memory component 102, and the subject innovation is not so limited, as the subject innovation can comprise a memory that can include nonvolatile memory and/or volatile memory. The storage components of such a memory can include, for example, other components (e.g., resistive components (not shown), diode components (not shown), magnetic spin-type components (not shown)) that are not explicitly described herein but which are known in the art, where such components can facilitate, for example, the storage and/or control of data.

Referring to FIG. 4, illustrated is a block diagram of a system 400 that can facilitate secure access of data associated with a memory component in accordance with an aspect of the disclosed subject matter. System 400 can include a memory component 102 that can facilitate storage of data. The memory component 102 can include a memory array(s) 104 that can comprise a plurality of memory cells (not shown), wherein each memory cell can store one or more bits of data. The memory component 102 can also include an access management component 116 that can facilitate controlling access to memory regions (e.g., memory regions 106, 108, 110, 112, as illustrated in FIG. 1 and described herein), for example, by enabling and/or performing a read, a write, an erase, and/or a wipe erase, based in part on proper authentication information received by the access management component 116. It is to be appreciated and understood that the memory component 102, the memory array(s) 104, and the access management component 116 each can be the same or similar, and/or can contain the same or similar functionality, as respective components, as more fully described herein, for example, with regard to system 100, system 200, and/or memory device 300.

In one aspect, system 400 can include a processor component 402 that can be associated with the memory component 102 and other components via a bus. In accordance with an embodiment of the disclosed subject matter, the processor component 402 can be a typical applications processor that can manage communications and run applications. For example, the processor component 402 can be a processor that can be utilized by a computer, mobile handset, personal data assistant (PDA), or other electronic device. The processor component 402 can generate and/or provide (e.g., transmit) commands, including read, write, and/or erase commands, in order to facilitate reading data from, writing data to, and/or erasing data from the memory component 102.

The communication of information between the processor component 402, the memory component 102, and other components, can be facilitated via a bus that can be comprised of any of several types of bus structure(s) including, but not limited to, a peripheral bus or external bus, and/or a local bus using any variety of available bus architectures including, but not limited to, Open NAND Flash Interface, Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

In another aspect, system 400 can also comprise a cryptographic component 404 that can employ symmetric cryptographic tools and accelerators (e.g., Twofish, Blowfish, AES, TDES, IDEA, CAST5, RC4, etc.) to facilitate data security. The cryptographic component 404 also can provide asymmetric cryptographic accelerators and tools (e.g., RSA, Digital Signature Standard (DSS), and the like) to facilitate encrypting and/or decrypting data, and/or generating a digital signature, to facilitate data security. Additionally, cryptographic component 404 can provide accelerators and tools (e.g., Secure Hash Algorithm (SHA) and its variants such as, for example, SHA-0, SHA-1, SHA-224, SHA-256, SHA-384, and SHA-512) to facilitate encrypting and/or decrypting data to facilitate data security.

System 400 can also contain an authentication component 406 that can work in conjunction with the access management component 116 to facilitate controlling access to the memory component 102 and securing data associated with the memory component 102. In one aspect, the authentication component 406 can solicit authentication data (e.g., authentication credential) from an entity, and, upon the authentication data so solicited, can be employed, individually and/or in conjunction with information acquired and ascertained as a result of biometric modalities employed, to facilitate controlling access to the memory component 102. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), a physical signature (e.g., PUF), and the like, for example. Additionally and/or alternatively, public key infrastructure (PKI) data can also be employed by authentication component 406. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 406 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

In accordance with one embodiment of the disclosed subject matter, the memory component 102, and/or other components, such as the cryptographic component 404 and/or authentication component 406, can be situated or implemented on a single integrated-circuit chip. In accordance with another embodiment, the memory component 102 and/or other components, such as the cryptographic component 404 and/or authentication component 406, can be implemented on an application-specific integrated-circuit (ASIC) chip. In yet another embodiment, the memory component 102, and/or other components, such as the cryptographic component 404 and/or authentication component 406, can be situated or implemented on multiple dies or chips.

Referring to FIG. 5, depicted is a block diagram of a system 500 that can employ intelligence to facilitate access of data associated with a memory in accordance with an aspect of the disclosed subject matter. System 500 can include a memory component 102 that can be comprised of a non-volatile memory (e.g., single-bit flash memory, multi-bit flash memory) and/or volatile memory (e.g., SRAM). The memory component 102 can include a memory array 104 that can be comprised of a plurality of memory cells (not shown), which can be memory locations, wherein, for each memory cell, one or more bits of data can be stored, and from which stored data can be read. The memory array 104 can comprise one or more memory regions (e.g., memory regions 106, 108, 110, 112, as depicted in FIG. 1 and described herein) that can each contain a subset of memory cells, and each memory region can be associated with an authentication credential (e.g., password, pass phrase, PIN, biometric identification information, etc.), where a respective authentication credential can be utilized to facilitate access to the respective memory region. The memory component 102 can also include an access management component 116 that can facilitate controlling access to the one or more memory regions 116 in the memory array 104. It is to be appreciated that the memory component 102, memory array 104, and access management component 116 each can be the same or similar as respective components, and/or can contain the same or similar functionality as respective components, as more fully described herein, for example, with regard to system 100, system 200, memory device 300, and/or system 400.

The system 500 can further include an intelligent component 502 that can be associated with the access management component 116 and/or other components to facilitate analyzing data, such as current and/or historical information, and, based in part on such information, can make an inference(s) and/or a determination(s) regarding, for example, whether an authentication credential or other authentication information is valid, whether the predetermined access criteria is satisfied, whether a security record is current, whether a previous security record has been erased, whether there is an attempt to hack into a memory region(s) in the memory component 102, etc.

For instance, the intelligent component 502 can infer that an authentication credential is valid, or is not valid, based in part on current and/or historical evidence relating to the memory region that is attempting to be accessed, the security record associated with the memory region, received authentication information, and/or other information. As another example, the intelligent component 502 can analyze current and/or historical evidence and can determine that a hacker is attempting to gain unauthorized access to a memory regions if the authentication credentials presented on subsequent attempts to access the memory region(s) are sequential or follow a pattern which can indicate that a hacker is attempting to gain unauthorized access to the memory region(s).

It is to be understood that the intelligent component 502 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 500 also can include a presentation component 504, which can be associated with the host processor 402. The presentation component 504 that provides various types of user interfaces to facilitate interaction between a user and any component coupled to the host processor 402. As depicted, the presentation component 504 is a separate entity that can be utilized with the host processor 402 and associated components. However, it is to be appreciated that the presentation component 504 and/or similar view components can be incorporated into the host processor 402 and/or a stand-alone unit. The presentation component 504 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 402.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 6-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
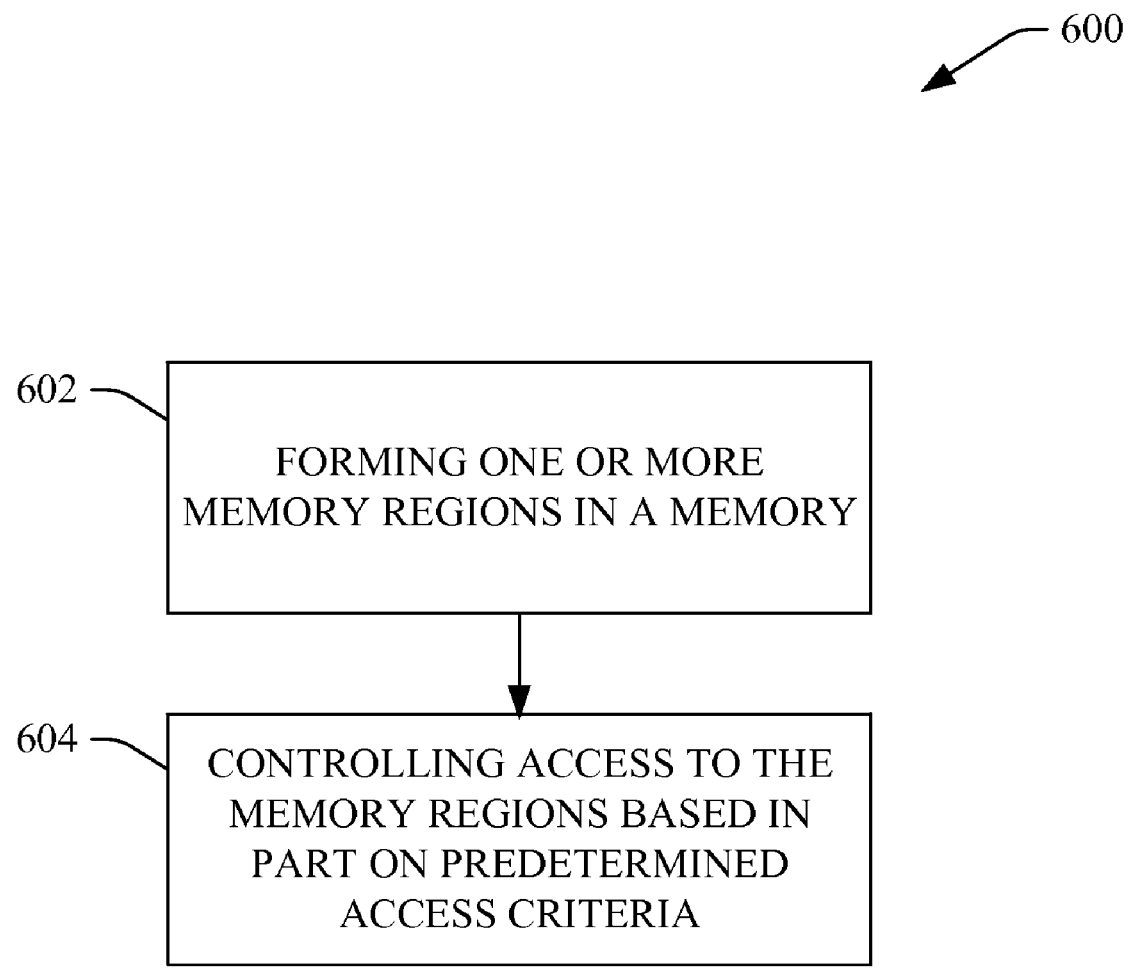
FIG. 6 depicts a methodology that can facilitate controlling access to memory regions associated with a memory in accordance with an aspect of the disclosed subject matter.

Referring to FIG. 6, a methodology 600 that can facilitate controlling access to data associated with a memory in accordance with an aspect of the disclosed subject matter is illustrated. At 602, one or more memory regions (e.g., 106, 108, 110, 112) can be formed in a memory component (e.g., 102). In one aspect, the memory component can comprise a plurality of memory cells that can be contained in a memory array(s) (e.g., 104). One or more memory regions can be formed that can each contain a respective subset of the memory cells.

At 604, access to a memory region(s) can be enabled based in part on access criteria associated with the memory region(s). In one aspect, each memory region can be associated with a respective authentication credential(s) that can be presented to an access management component (e.g., 116) in the memory component, where the access management component can facilitate controlling access to the one or more memory regions based in part on access criteria. The access criteria can be based in part on the type of access (e.g., read, write, erase, wipe erase) desired, for example. For instance, the access criteria to access a memory region to read data from the memory region can be that a proper authentication credential be provided a predetermined number of times (e.g., 2 times) to facilitate ensuring that access is proper (and/or desired by the user). As another example, the access criteria to perform a wipe erase of a memory region can be that a valid authentication credential (e.g., the same authentication credential as for a read, or a different authentication credential than the authentication credential for a read, as desired) be provided a disparate predetermined number of times (e.g., 3 times) to facilitate ensuring that the wipe erase is proper and/or to minimize the risk of an accidental wipe erase of the memory region. As yet another example, the access criteria can specify that more than one authentication credential (e.g., a first authentication credential and a second authentication credential) be presented to the access management component 116 in order to access a memory region(s) to perform a desired operation.

In another aspect, the access management component can receive authentication information (e.g., password), which can be provided by a user, for example. If proper authentication information is presented to the access management component (and a memory region is not locked), the access management component can facilitate enabling access to a memory region(s), for example, to facilitate reading, writing, erasing, and/or wipe erasing data associated with the memory region(s), based in part on the access rights granted.

In yet another aspect, the access management component can facilitate locking a memory region(s) based in part on a predetermined access criteria. For example, the access criteria can be that a memory region and/or memory component (e.g., 102) can be locked, so that it cannot be accessed, if there are a number of unsuccessful attempts to gain access (e.g., authentication failures) to a memory region, such as where the authentication information (e.g., authentication credential) received by the access management component does not match the authentication information associated with such memory region, and the number of unsuccessful attempts is equivalent to a predetermined maximum number of attempts (e.g., 3 attempts) to access a memory region. The access management component can facilitate resetting to unlock a locked memory region so that the memory region can be accessed, where the reset can involve a power cycling (e.g., powering down and powering up) of the memory component, a hardware reset or software reset of the memory component, and/or an administrator or super user unlocking the memory region(s) and/or memory component.

The subject innovation can facilitate securing data by managing access to memory regions in the memory component. Further, the subject innovation can facilitate data security, for example, with regard to sensitive information that a user can desire be erased, by enabling a wipe erase to completely erase data from a desired memory region(s). At this point, methodology 600 can end.

Figure 7:
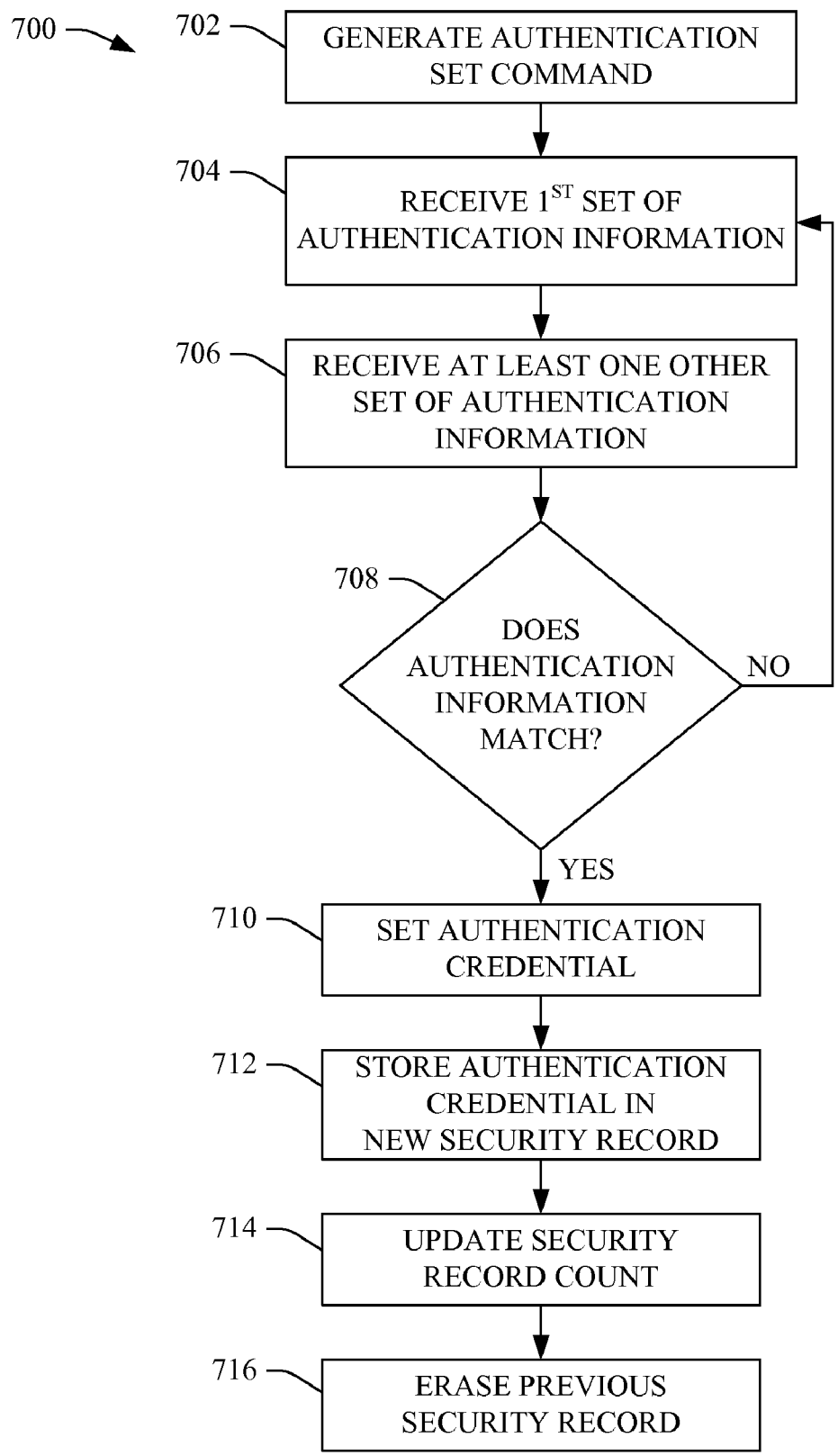
FIG. 7 illustrates a methodology that can facilitate setting a password to facilitate controlling access to memory regions associated with a memory in accordance with an aspect of the disclosed subject matter.

Turning to FIG. 7, depicted is a methodology 700 that can facilitate accessing data associated with a memory region(s) in a memory in accordance with an aspect of the disclosed subject matter. At 702, an authentication set command can be generated. In one aspect, an authentication credential associated with the memory region (e.g., 104) in the memory component (e.g., 102) can be set at a default authentication credential (e.g., authentication value), such as can be set by the manufacturer or other authorized entity, or a memory region can be set for unrestricted access, for example. A user can desire to change the default authentication credential, or to change from a previous authentication credential, such as an authentication credential previously set by a user, to a new authentication credential, or to control (e.g., restrict) access to a memory region that is unrestricted by making such memory region authentication protected. In accordance with an aspect, input can be received from a user indicating a desire by the user to set and/or change the authentication credential, and an authentication set command can be generated based in part on the user input. In another aspect, the command can be provided to the access management component, which can facilitate setting of the authentication credential.

At 704, a first set of authentication information can be received. In one aspect, a user can input a desired authentication credential (e.g., alphanumeric sequence of characters) and such authentication credential can be received by the access management component. At 706, one or more other sets of authentication information (e.g., authentication credential) can be received. In one aspect, the user can be prompted to input the desired authentication credential again (e.g., one or more additional times) to facilitate ensuring the accuracy of the authentication information. The access management component can receive the one or more other set of authentication information, as input by the user. It is to be appreciated that, while the one or more other sets of authentication information can be received and utilized, for example, to facilitate ensuring the accuracy of the authentication credential desired by the user, the subject innovation is not so limited, as in accordance with an aspect of the subject innovation, as desired, no additional set of authentication information need be presented in order to set an authentication credential.

At 708, a determination can be made regarding whether the respective sets of authentication information match each other. In one aspect, a compare component associated with the access management component can compare respective sets of authentication information with each other to determine whether the respective sets of authentication information match each other. If it is determined that the respective sets of authentication information do not match each other, methodology 700 can return to reference numeral 704, where another set(s) of authentication information can be received, for example, in another attempt to set the authentication credential, and methodology 700 can proceed from that point. For instance, if the attempt to set the authentication credential fails because the respective sets of authentication information do not match each other, the access management component can facilitate providing an indication and/or prompt to the user indicating that the attempt to set the authentication credential failed and/or to provide authentication credential information to facilitate setting the authentication credential. If, at 708, it is determined that the respective sets of authentication information match each other, at 710, the authentication credential can be set based in part on the authentication information.

At 712, the authentication credential and associated information can be stored. In one aspect, the authentication credential and associated information can be stored as a security record in an authentication memory location in a secure region in the memory component. In addition to the user-provided authentication information, the authentication information can include and/or be associated with a start memory address and/or end memory address that can demarcate the region in the memory component that is associated with the authentication credential, where such region can be a section of the memory array available to the user associated with the authentication credential. In another aspect, the authentication information can include a size of the memory region associated with the authentication credential, which can be utilized along with a start memory address to demarcate the region in the memory component that is associated with the authentication credential. In accordance with one embodiment, authentication hint information can be stored along with the authentication credential in the authentication memory location, where the authentication hint information can be provided by the user to facilitate assisting a user to remember an authentication credential, for example.

At 714, the count (e.g., security record count) associated with the security records of the memory regions can be updated (if such counting aspect of the methodology is implemented). In one aspect, the access management component can facilitate updating and/or incrementing the count related to security records based in part on the new security record being created when the authentication credential and other associated information is stored. Updating such count can facilitate accessing of the proper (e.g., current) security records by the access management component to facilitate controlling access to the memory regions.

At 716, the previous security record can be erased. In one aspect, the access management component can facilitate erasing the previous security record associated with the memory region for which the authentication credential has just been set and/or updated to facilitate security of the memory component and data associated therewith. At this point, methodology 700 can end.

Figure 8:
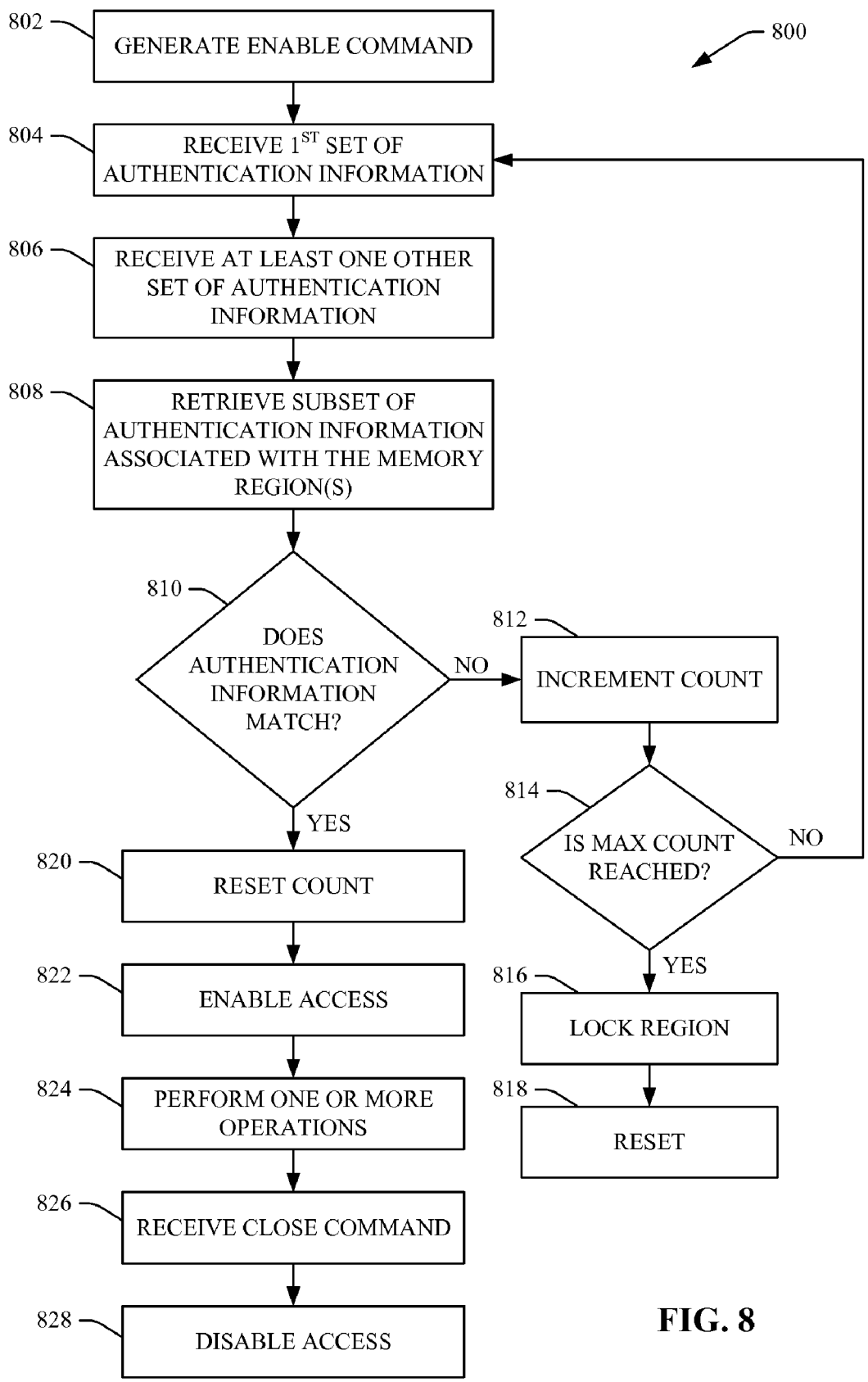
FIG. 8 depicts a methodology that can facilitate enabling access to a memory region(s) associated with a memory in accordance with an aspect of the disclosed subject matter.

FIG. 8 depicts a methodology 800 that can facilitate accessing a memory region associated with a memory in accordance with an aspect of the disclosed subject matter. At 802, an access enable command can be generated. In one aspect, an access enable command can facilitate enabling access to a memory region in the memory to perform a read, a write, and/or an erase based in part on the type of access enable command. In another aspect, the access enable command can be generated based in part on received information indicating a desire to access a memory region in the memory array of a memory component. For example, a user can desire to access a memory region in the memory component. The user can input information indicating a desire to access the memory region.

At 804, a first set of authentication information (e.g., authentication credential) can be received. In one aspect, the access management component can receive the first set of authentication information, which can be input by a user via an interface associated with the memory component. In accordance with another aspect, the authentication credential to enable access can be the same with respect to access for a read, a write, or an erase, or there can be disparate passwords for disparate types of access with regard to respective types of operations (e.g., read, write, erase), as desired.

At 806, one or more other sets of authentication information can be received. In one aspect, the access management component can receive the one or more other sets of authentication credentials, which can be input by a user via the interface. For example, it can be desired that authentication credential be presented a predetermined number of times (e.g., 2 times, 3 times, etc.) to facilitate ensuring the accuracy of the authentication information received, securing the memory region from unauthorized access, and/or accidental access or performance of operations. It is to be appreciated that, while the one or more other sets of authentication credentials can be received and utilized, the subject innovation is not so limited, as in accordance with an aspect of the subject innovation, as desired, the act at reference numeral 806 can be bypassed and no additional set of authentication information need be presented in order to facilitate enabling access to the memory region to perform a read, write, and/or erase. As another example, the access criteria can specify that more than one authentication credential (e.g., a first authentication credential and a second authentication credential) be presented to the access management component 116 in order to access a memory region(s) to perform a desired operation. At 808, authentication information associated with the memory region can be retrieved. In one aspect, the access management component can facilitate retrieving authentication information, such as the authentication credential and/or information demarcating the memory region, from a secure memory location in the memory array.

At 810, a determination can be made regarding whether the respective sets of received authentication information match the authentication information associated with the memory region. In one aspect, a compare component associated with the access management component can compare respective sets of authentication information with the authentication information associated with the memory region, where the authentication information can be retrieved from a security record associated with the memory region, to determine whether the respective sets of authentication information each match the authentication information associated with the memory region. If it is determined that the respective sets of authentication information do not match the authentication information associated with the memory region, at 812, a count (e.g., authentication failure count) can be incremented. In one aspect, the compare component can indicate to a counter component that each of the respective sets of authentication information do not match the authentication information of the memory region, and the counter component can increment an authentication failure count associated with the access enable command by one, for example.

At 814, a determination can be made as to whether the maximum number of attempts (e.g., authentication failures) have been made to enter a valid authentication credential to enable access to the memory region in the memory component. The maximum number of access attempts (e.g., attempts to enter a valid authentication credential) can be a predetermined number, as set by the manufacturer or other authorized entity. If it is determined that the maximum number of access attempts has not been reached, methodology 800 can return to reference numeral 804, where a first set of authentication information can be received, and methodology 800 can proceed from that point. For instance, the user interface associated with the memory component can provide an indication to a user to enter authentication information again and/or that the previous authentication credential was invalid. The user can provide a set of authentication information via the user interface, and such set of authentication credential information can be received by the access management component.

If, at 814, it is determined that the maximum number of access attempts have been made, at 816, the memory region and/or memory component can be locked. In one aspect, the access management component can facilitate locking the memory region(s) and/or the memory component in the memory array, so that no one can access the memory region(s) until the memory component goes through a power cycle, such as a power down of the memory component and a power up of the memory component, a hardware reset or software rest of the memory component and/or associated electronic device (e.g., cellular phone), and/or an administrator or a super user unlocks the memory region and/or the memory component. This can facilitate reducing the risk of a hacker hacking into the memory component, as the power cycling and/or hardware or software resetting of the memory component can take a relatively significant period of time, which can frustrate the hacker's attempts to gain access to the memory region(s) in the memory component. At 818, a reset can be performed. In one aspect, the memory component can be reset via a power cycling of the memory component, where the memory component can be powered down and powered up to reset the memory component, and/or a hardware or software reset of the memory component.

Referring back to reference numeral 810, if, at 810, it is determined that each of the respective sets of received authentication information match the authentication information associated with the memory region, at 820, the count can be reset. In one aspect, the compare component can provide an indication to the counter component that each of the respective sets of authentication information match the authentication information associated with the memory region, and, based in part on such information, the counter component can reset the count (e.g., to 0), as the authentication credential provided can be considered valid. It is to be appreciated that the counter component 206 can maintain separate authentication failure counts for separate memory region(s), as desired.

At 822, access can be enabled. In one aspect, the access management component can enable access for the memory region associated with the authentication credential that was received by the access management component. With access of the memory region enabled, a user can access such memory region based in part on the type of access granted, where the type of access granted can be based in part on the authentication information received by the access management component. In another aspect, the authentication credential can be associated with a authentication memory location that can include information regarding the authentication credential as well as information regarding the associated memory region(s), such as a start memory address and/or an end address for a memory region, a size of a memory region, and/or other information (e.g., hint information), where such authentication information can be utilized to facilitate determining the portion of the memory array (e.g., the memory region(s) associated with the authentication credential) to which access is enabled.

At 824, one or more operations can be performed with regard to memory locations in the memory region and/or data stored in memory locations in the memory region. In one aspect, a memory location(s) in the memory region can be accessed and one or more operations (e.g., read, write, erase) can be performed with regard to the memory location(s) in the memory region and/or data stored in the memory location(s) in the memory region, where the type of operations that can be authorized and/or performed can be based in part on the type of access granted to the user based in part on the received authentication information.

At 826, a close command can be received. In one aspect, the close command can be related to access of the memory region associated with the received authentication credential and can facilitate disabling the access with regard to such memory region. In another aspect, user input can be received via the user interface, and based in part on the received user input, the close command can be generated, provided to the access management component and/or received by the access management component.

At 828, access can be disabled. In one aspect, the access management component can facilitate disabling the access to the memory region associated with the received authentication credential based in part on a close command received by the access management component. As a result, the user and other entities are not able to access such memory region or information stored therein. In another aspect, if a write or erase operation is being performed on data associated with the memory region at the time read access is disabled (e.g., a write operation to update a phone number in a contact list on a cellular phone), the write and erase access can remain in their respective states (e.g., enabled), such that the write or erase operation can be completed, even though read access can be disabled based in part on the received close command. After the write or erase operation is completed, the write access or erase access can be closed. At this point, methodology 800 can end.

Figure 9:
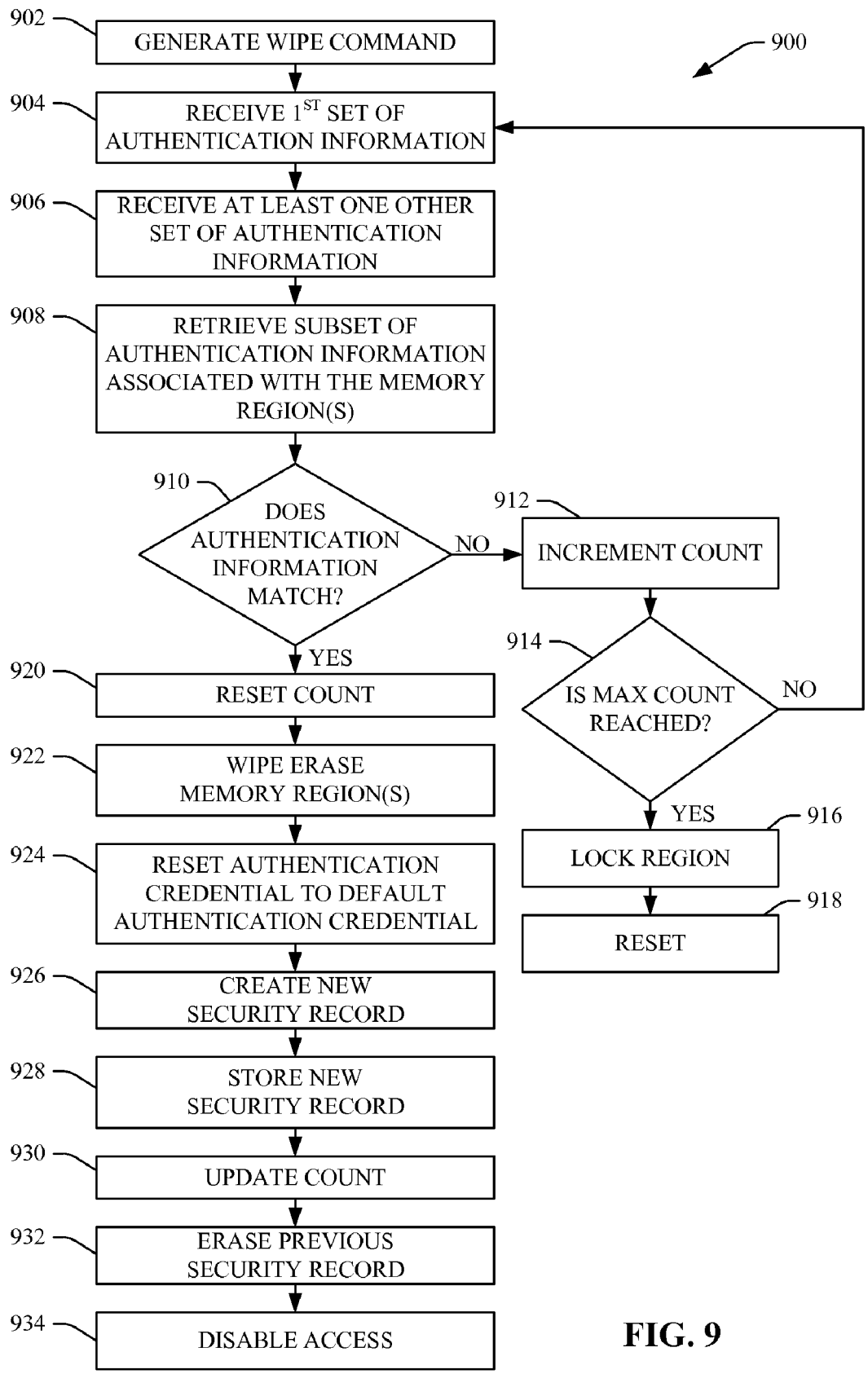
FIG. 9 illustrated a methodology that can facilitate wipe erasing a memory region(s) associated with a memory in accordance with an aspect of the disclosed subject matter.

Turning to FIG. 9, illustrated is a methodology 900 that can facilitate wipe erasing a memory region(s) in a memory in accordance with an aspect of the disclosed subject matter. At 902, a wipe command can be generated. In one aspect, a wipe command can facilitate wipe erasing a memory region(s) in the memory, where a wipe erase can erase the memory locations in the memory region(s) so that the memory locations no longer contain data (e.g., in flash memory, the memory locations of the memory region(s) can be erased so that the bits of each memory location are all set to 1s), as opposed to simply erasing data (e.g., deleting data) where such erased or deleted data can still reside in the memory locations but information (e.g., pointers) that facilitate accessing such data are removed, deleted, or modified in such a manner that they are readily available with a normal operating system. In another aspect, the wipe erase command can be generated based in part on received information indicating a desire to wipe a memory region(s) in the memory array of a memory component. For example, a user can desire to wipe the data in a memory region(s) in the memory component. The user can input information indicating a desire to wipe the memory region, which can be received by the access management component.

At 904, a first set of authentication information (e.g., authentication credential) can be received. In one aspect, the access management component can receive the first set of authentication information, which can be input by a user via an interface associated with the memory component. In accordance with another aspect, the authentication information can be related to performing a wipe erase of a memory region and/or can relate to performing other operations (e.g., read, write, erase) in the memory region. At 906, one or more other sets of authentication information can be received. In one aspect, the access management component can receive the one or more other sets of authentication information, which can be input by a user via the user interface. For example, it can be desired that authentication information be presented a predetermined number of times (e.g., 1 time, 2 times, 3 times, etc.) to facilitate ensuring the accuracy of the authentication information presented, securing the memory region from unauthorized access, and/or ensuring that the user desires to perform the wipe operation so that an accidental wipe erase is not performed and/or the risk of an accidental wipe erase is minimized. It is to be appreciated that, while the one or more other sets of authentication credentials can be received and utilized, the subject innovation is not so limited, as in accordance with an aspect of the subject innovation, as desired, the act at reference numeral 906 can be bypassed and no additional set of authentication information need be presented in order to facilitate enabling access to the memory region to perform a wipe erase. As another example, the access criteria can specify that more than one authentication credential (e.g., a first authentication credential and a second authentication credential) be presented to the access management component 116 in order to access a memory region(s) to perform a desired operation, where each disparate authentication credential is presented to the access management component 116 a predetermined number of times.

At 908, authentication information associated with the memory region can be retrieved. In one aspect, the access management component can facilitate retrieving authentication information, such as the authentication credential and/or information demarcating the memory region, from a secure memory location in the memory array.

At 910, a determination can be made regarding whether each of the respective sets of authentication information match the authentication information associated with the memory region. In one aspect, a compare component associated with the access management component can compare each of the respective sets of authentication information with the authentication information associated with the memory region to determine whether each of the respective sets of authentication information match the authentication information associated with the memory region. If it is determined that each of the respective sets of authentication information do not match the authentication information associated with the memory region, at 912, a count can be incremented. In one aspect, the compare component can indicate to a counter component that each of the respective sets of authentication information do not match the authentication information of the memory region, and the counter component can increment a count (e.g., authentication failure count) associated with the wipe erase command by one, for example.

At 914, a determination can be made as to whether the maximum number of attempts (e.g., authentication failures) have been made to enter a valid authentication credential to access and perform a wipe erase of the memory region in the memory component. In one aspect, the maximum number of attempts (e.g., attempts to enter a valid authentication credential) can be a predetermined number, as set by the manufacturer or other authorized entity. If it is determined that the maximum number of access attempts has not been reached, methodology 900 can return to reference numeral 904, where a first set of authentication information can be received, and methodology 900 can proceed from that point. For instance, the user interface associated with the memory component can provide an indication to a user to enter authentication information again and/or that the previous authentication information was invalid. The user can provide a set of authentication information via the user interface, and such set of authentication information can be received by the access management component.

If, at 914, it is determined that the maximum number of access attempts have been made (e.g., maximum number of authentication failures), at 916, the memory region(s) and/or memory component can be locked. In one aspect, the access management component can facilitate locking the memory region(s) in the memory array and/or the memory component, so that no one can access the memory region(s) and/or the memory component until the memory component goes through a power cycle, such as a power down of the memory component and a power up of the memory component, a hardware reset or software reset of the memory component and/or associated electronic device (e.g., cellular phone), and/or an administrator or super user unlocks the memory region(s) and/or memory component. This can facilitate reducing the risk of a hacker hacking into the memory component, as the power cycling and/or resetting of the memory component can take a relatively significant period of time, which can frustrate the hacker's attempts to gain access to and/or wipe erase data in the memory region(s) in the memory component. At 918, a reset can be performed. In one aspect, the memory component can be reset via a power cycling of the memory component, where the memory component can be powered down and powered up to reset the memory component, performing a hardware or software reset of the memory component, and/or an administrator or super user unlocking the memory region(s) and/or memory component.

Referring back to reference numeral 910, if, at 910, it is determined that each of the respective sets of authentication information match the authentication information associated with the memory region, at 920, the count (e.g., authentication failure count) can be reset. In one aspect, the compare component can provide an indication to the counter component that each of the respective sets of authentication information match the authentication information of the memory region, and, based in part on such information, the counter component can reset the count (e.g., to 0), as the authentication credential provided can be considered valid. At 922, the memory region(s) associated with the authentication credential can be wipe erased. In one aspect, the access management component can facilitate performing a wipe erase (e.g., permanent erase) of the memory region(s) associated with the authentication credential.

At 924, the authentication credential can be reset to a default authentication credential (or the associated memory region can be set to unrestricted access, as desired). In one aspect, the access management component can facilitate resetting the authentication credential (e.g., password) to a default authentication credential. At 926, a new security record containing the default authentication credential or information indicating the memory region is set to unrestricted access, and/or other information associated with the memory region can be created. In one aspect, the access management component can facilitate creating the new security record for such memory region, which can contain the authentication information (e.g., authentication credential) and/or other information regarding the memory region, such as the memory region start address, memory region end address, and/or memory region size, etc., to which the authentication credential (if any) can be associated. At 928, the new security record can be stored. In one aspect, the access management component can facilitate storing the new security record in a authentication memory location in the memory component.

At 930, the count associated with the security records (e.g., security record count) of the memory regions can be updated. In one aspect, the access management component can facilitate updating and/or incrementing the count related to security records based in part on the new security record being created when the default authentication credential (or information indicating unrestricted access to the memory region) and other associated information is stored. Updating such count can facilitate accessing of the proper (e.g., current) security records by the access management component to facilitate controlling access to the memory regions.

At 932, the previous security record can be erased. In one aspect, the access management component can facilitate erasing the previous security record associated with the memory region for which the authentication credential has just been reset to a default authentication credential (or no authentication credential if the memory region is set for unrestricted access) to facilitate security of the memory component and data associated therewith. After being erased, the authentication memory location associated with the previous security record can be available and can be utilized for an update or change to a security record when authentication information is changed and/or a wipe erase is performed with regard to a memory region.

At 934, access to the memory region(s) can be disabled. In one aspect, the access management component can facilitate disabling the access to such memory region(s) based in part on the wipe erase command received by the access management component. As a result, the user and other entities are not able to access such memory region or information stored therein until a proper authentication credential (e.g., default authentication credential) is presented. It is to be appreciated that, in one aspect, if the memory region is set to unrestricted access, access to such memory region is not disabled, as desired. At this point, methodology 900 can end.

Figure 10:
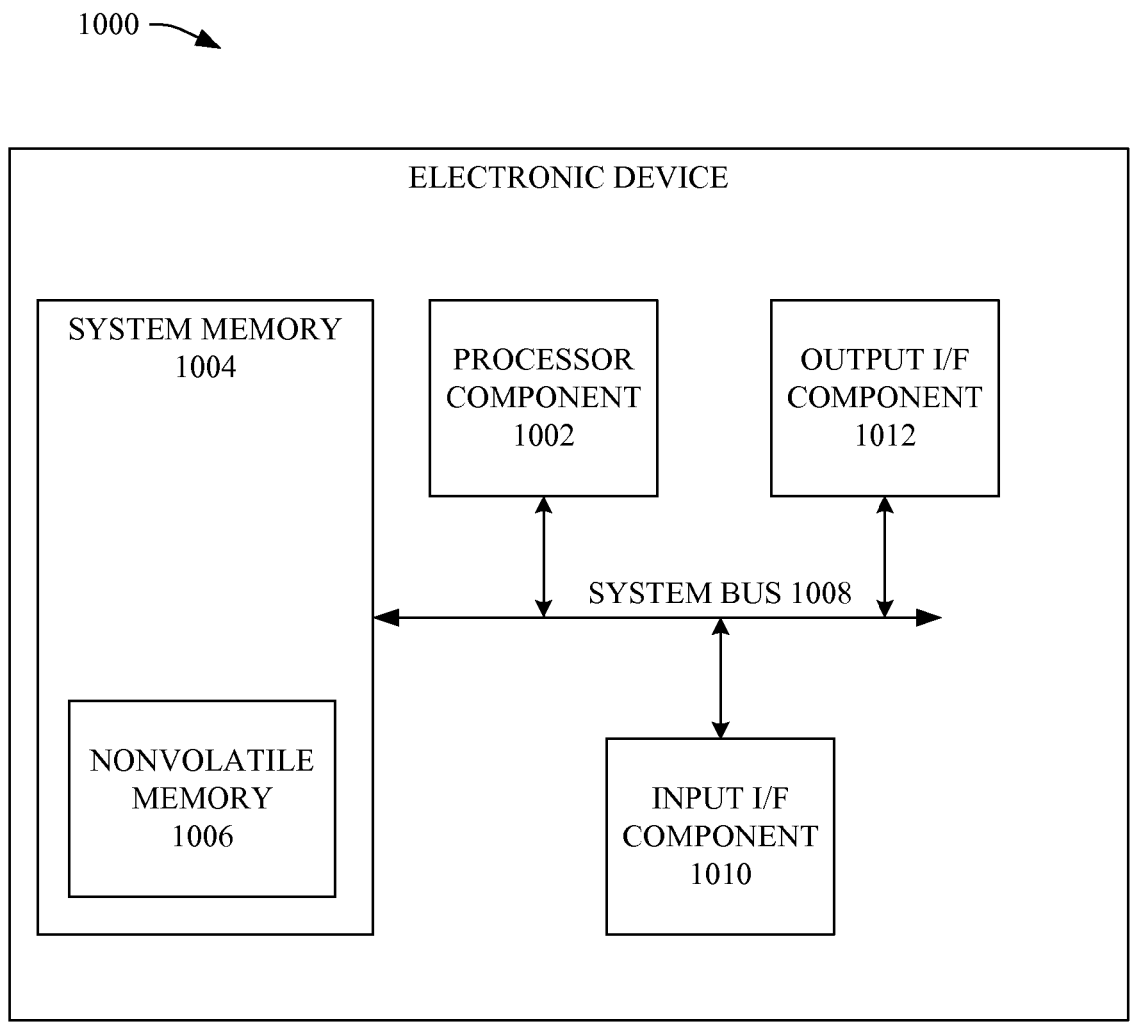
FIG. 10 illustrates an example of an electronic device that can be associated with a memory in accordance with an aspect of the disclosed subject matter.

Referring to FIG. 10, illustrated is a block diagram of an exemplary, non-limiting electronic device 1000 that can comprise and/or incorporate system 100, system 200, memory device 300, system 400, and/or system 500, or a respective portion(s) thereof. The electronic device 1000 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1000 can include, but are not limited to, a processor component 1002 (e.g., which can be and/or can include the same or similar functionality as processor component 402, as depicted in FIG. 4 and described herein), a system memory 1004, which can contain a nonvolatile memory 1006, and a system bus 1008 that can couple various system components including the system memory 1004 to the processor component 1002. The system bus 1008 can be any of several types of bus structures including a memory bus or memory controller, a peripheral bus, or a local bus using any of a variety of bus architectures.

Electronic device 1000 can typically include a variety of computer readable media. Computer readable media can be any available media that can be accessed by the electronic device 1000. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1006 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1000. Communication media typically embodies computer readable instructions, data structures, program modules or other data in a modulated data signal such as a carrier wave or other transport mechanism and includes any information delivery media.

The system memory 1004 can include computer storage media in the form of volatile (e.g., SRAM) and/or nonvolatile memory 1006 (e.g., flash memory). For example, system memory 1004 can comprise, can be the same or similar as, and/or can contain the same or similar functionality as, memory component 102 (e.g., as described herein with regard to system 100, system 200, system 400, etc.). A basic input/output system (BIOS), containing the basic routines that can facilitate transferring information between elements within electronic device 1000, such as during start-up, can be stored in the system memory 1004. The system memory 1004 typically also can contain data and/or program modules that can be accessible to and/or presently be operated on by the processor component 1002. By way of example, and not limitation, the system memory 1004 can also include an operating system(s), application programs, other program modules, and program data.

The nonvolatile memory 1006 can be removable or non-removable. For example, the nonvolatile memory 1006 can be in the form of a removable memory card or a USB flash drive. In accordance with one aspect, the nonvolatile memory 1006 can include flash memory (e.g., single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory.

A user can enter commands and information into the electronic device 1000 through input devices (not shown) such as a keypad, microphone, tablet, or touch screen although other input devices can also be utilized. These and other input devices can be connected to the processor component 1002 through input interface component 1010 that can be connected to the system bus 1008. Other interface and bus structures, such as a parallel port, game port or a universal serial bus (USB) can also be utilized. A graphics subsystem (not shown) can also be connected to the system bus 1008. A display device (not shown) can be also connected to the system bus 1008 via an interface, such as output interface component 1012, which can in turn communicate with video memory. In addition to a display, the electronic device 1000 can also include other peripheral output devices such as speakers (not shown), which can be connected through output interface component 1012.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates control of access to at least one memory, comprising:
    the at least one memory that contains a plurality of memory regions to facilitate storage of data; and
    an access management component that facilitates control of access to the plurality memory regions based in part on a predetermined access criteria, the access management component:
        compares received authentication data and compares the received authentication data to authentication data associated with a memory region and makes a determination regarding whether the received authentication data matches the authentication data associated with the memory region;
        facilitates a wipe erase of a memory region when the received authentication data matches the authentication data associated with the memory region; and
        facilitates creation of a new security record that contains a default authentication credential.

2. The system of claim 1, the predetermined access criteria is based in part on a type of operation being performed, a predetermined number of times a proper authentication credential is to be presented in order to grant access, a predetermined number or type(s) of disparate authentication credentials to be presented to be granted access to a memory region, a predetermined maximum number of attempts to gain access to a memory region, or a type of user, or a combination thereof.

3. The system of claim 2, the access management component facilitates creation of an authentication credential based in part on received information associated with an authentication set command.

4. The system of claim 2, the access management component facilitates access to the memory region when the received authentication data matches the authentication data associated with the memory region.

5. The system of claim 2, the access management component facilitates locking access to a memory region when the predetermined access criteria is not satisfied.

6. An electronic device comprising the system of claim 2.

7. The system of claim 1, the access management component facilitates creation of an authentication credential based in part on received information associated with an authentication set command.

8. The system of claim 1, the access management component facilitates access to the memory region when the received authentication data matches the authentication data associated with the memory region.

9. The system of claim 1, the plurality of memory regions are respectively associated with disparate authentication credentials, and each of the memory regions are respectively associated with a security record that contains at least one of a authentication credential, a start memory address, an end memory address, a size of a memory region, or hint information, or a combination thereof, wherein the security record is stored in a authentication memory location in the at least one memory component.

10. The system of claim 1, the access management component facilitates locking access to a memory region when the predetermined access criteria is not satisfied.

11. The system of claim 10, the memory region is unlocked when there is a reset of the at least one memory component.

12. An electronic device comprising the system of claim 1.

13. The electronic device of claim 12, the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

14. A method that facilitates controlling access to at least one memory, comprising:
forming one or more memory regions in the at least one memory; and
enabling access to the one or more memory regions based in part on an access criteria;
generating an authentication set command;
receiving a first set of authentication information;
receiving at least one other set of authentication information;
comparing the first set of authentication information to the at least one other set of authentication information;
setting an authentication credential associated with a memory region based in part on the received first set of authentication information when the first set of authentication information matches the at least one other set of authentication information, the authentication credential is a subset of the authentication information;
generating a new security record based in part on the authentication information;
updating the count associated with security records; and
erasing a previous security record associated with the memory region.

15. The method of claim 14, further comprising:
generating an enable command;
receiving authentication information;
retrieving authentication information associated with a memory region; and
comparing the received authentication information with the authentication information associated with the memory region.

16. The method of claim 15, further comprising:
incrementing a count if the received authentication information does not match the authentication information associated with the memory region;
at least one of:
receiving additional authentication information if the number of attempts to gain access to the memory region is less than the predetermined maximum number, or
locking access to the memory region if a predetermined maximum number of attempts to gain access to the memory region have been made unsuccessfully.

17. The method of claim 15, further comprising:
resetting a count;
enabling access to the memory region;
performing at least one operation associated with the memory region;
receiving a close command; and
disabling access to the memory region.

18. The method of claim 14, further comprising:
generating a wipe erase command;
receiving authentication information;
retrieving authentication information associated with a memory region; and
comparing the received authentication information with the authentication information associated with the memory region.

19. The method of claim 18, further comprising:
resetting a count associated with attempts to gain access to the memory region;
wipe erasing the memory region;
resetting an authentication credential to a default authentication credential;
creating a new security record associated with the memory region;
storing the new security record;
updating a count associated with security records;
erasing a previous security record associated with the memory region; and
disabling access to the memory region.

20. A method that facilitates controlling access to at least one memory, comprising:
forming one or more memory regions in the at least one memory; and
enabling access to the one or more memory regions based in part on an access criteria;
generating a wipe erase command;
receiving authentication information;
retrieving authentication information associated with a memory region;
comparing the received authentication information with the authentication information associated with the memory region;
incrementing a count if the received authentication information does not match the authentication information associated with the memory region;
at least one of:
receiving additional authentication information if the number of attempts to gain access to the memory region is less than a predetermined maximum number to gain access to the memory region that is associated with a wipe command, or
locking access to the memory region if the predetermined maximum number of attempts have been made unsuccessfully.

* * * * *